Patented Nov. 19, 1940

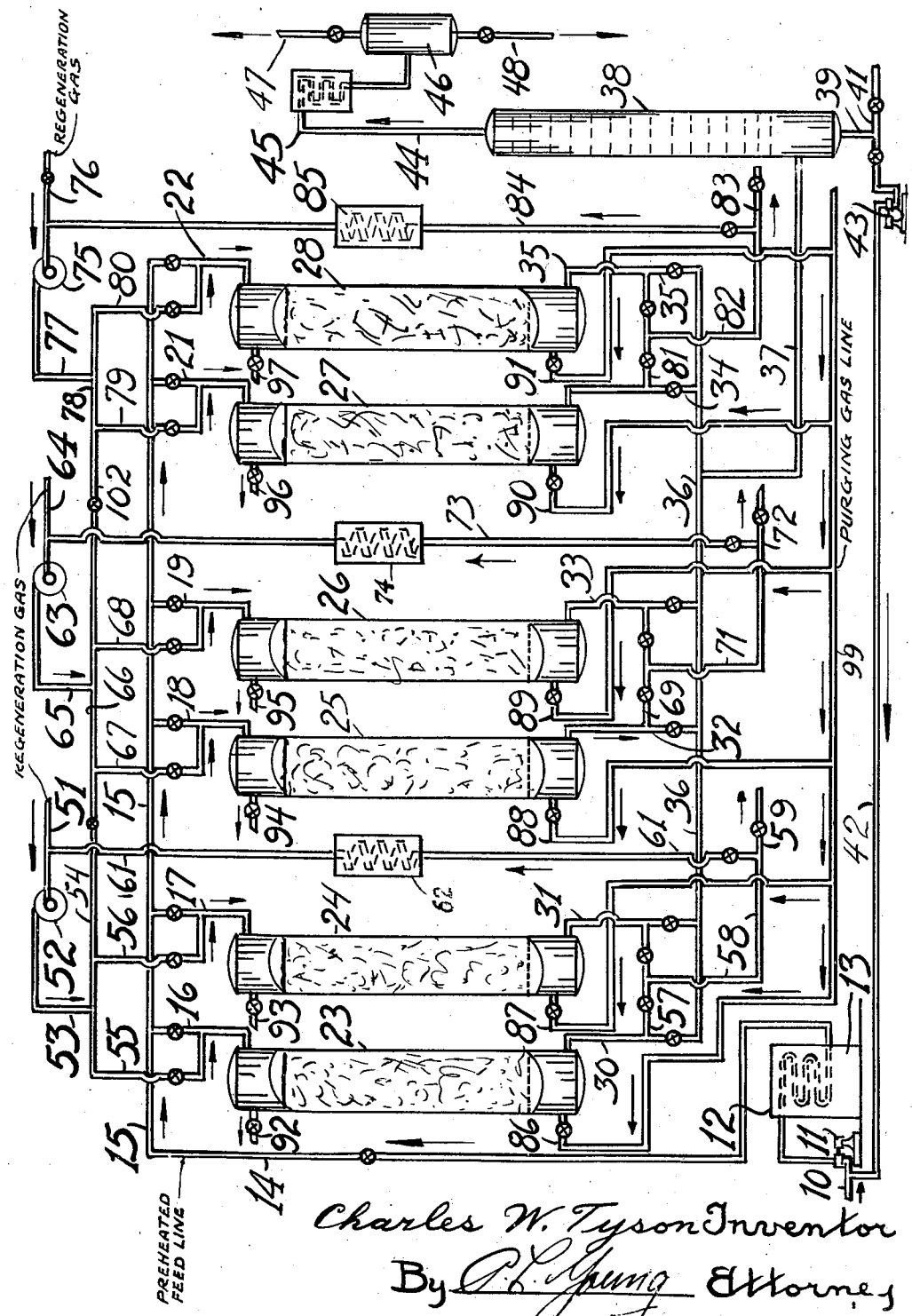

2,221,824

UNITED STATES PATENT OFFICE 2,221,824

CRACKING PETROLEUM OIL

Charles W. Tyson, Summit, N. J., assignor to Standard Oil Development Company, a corporation of Delaware Application December 23, 1938, Serial No. 247,401

9 Claims. (Cl. 196—52)

The present invention relates to the treatment of petroleum oil and pertains more particularly to improvements in the process for treating such oils in the presence of solid catalysts.

It has heretofore been proposed, for example, to crack hydrocarbon oils in the presence of solid adsorptive catalysts, such as, naturally active or activated clays and other synthetically produced adsorbent gels. During the cracking operation, the catalyst more or less gradually becomes fouled with carbonaceous deposits which lower the activity of the catalyst necessitating periodic regenerations to restore catalyst activity. During the regenerating process, it is necessary to control the temperature to avoid permanent loss in activity of the catalyst. However, despite careful control of the regenerating conditions, in most cases the activity of the catalyst gradually depreciates and it becomes necessary eventually to discard the catalyst and recharge the cracking unit with fresh catalyst.

According to one method of operation the oil vapors to be cracked pass through a reaction zone containing a stationary mass of catalyst and the cracking operation is periodically interrupted for the purpose of regenerating the catalyst.

When operating in this manner, it has heretofore been proposed to provide a bank of reaction chambers interconnected in parallel so that when the catalyst in one of the chambers becomes fouled with carbonaceous deposits the oil vapors to be cracked can be diverted into another chamber containing fresh or regenerated catalyst without interrupting the process or removing the catalyst from the reaction zone.

The present invention is directed primarily to a process involving the alternate cracking and regenerating cycle of the type just described although certain of the broader phases of the invention are not so limited.

In such process, after completion of the cracking cycle, and before regeneration is begun, it is desirable to free the reaction chamber of the oil vapors. The purging of the oil vapors from the reaction chamber can be accomplished either by flushing the chamber with inert gas such as steam or by evacuating the chamber. Likewise, after the regenerating cycle has been completed and before the reaction chamber is returned to the cracking cycle, it is desirable to purge the reaction chamber of combustion gases resulting from regeneration. This can likewise be accomplished either by steam flushing or by evacuation.

In the catalytic cracking process, the amount of oil converted into motor fuel during the passage of the oil vapors through the reaction zone, or in other words, the conversion per pass, has an important bearing on the economics of the process, for example, for any given oil to be cracked, there is an optimum range of conversion per pass which will produce the best results. If the conversion per pass is greater than the desired maximum, excessive amounts of low grade products, such as low molecular weight gaseous hydrocarbons and coke may be formed. If, on the other hand, the conversion per pass is below the desired minimum either a low yield of desired products is obtained or additional repumping and reheating is required to recycle unconverted constituents to obtain the same ultimate yield of gasoline from a given quantity of charging stock. The optimum conversion per pass will vary with trade requirements, the character of the charging stock the nature of the catalyst employed and other factors. For example, some petroleum oils can be cracked to a higher conversion per pass without involving excessive gas or coke losses than others. Also, some catalysts produce lower gas and coke losses for a given conversion into gasoline than do other catalysts. The optimum conversion per pass under various conditions may range, for example, between 30 and 60% depending upon the above factors. For any given charging oil and catalyst, the range of conversion per pass may be varied over a range of from 5–10% without seriously effecting the economics of the process.

The amount of oil converted into gasoline during the passage through the reaction zone is a function of the temperature, time of contact with the oil vapors with the catalyst and the activity of the catalyst. Since the activity of the catalyst normally depreciates with age, as before described, in order to maintain a constant conversion per pass, it is necessary to make compensating adjustments. In order to compensate for the reduction of activity of the catalyst with age, it has heretofore been proposed to increase the temperature or to increase the time of contact. Both of these compensating methods have inherent objections and practical limitations. While a certain amount of adjustment can be made, for example, by increase in the temperature, the amount of adjustment by such method is limited. If the temperature is increased too high, for example, considerable thermal cracking may take place within the pre-heating coils employed for heating the oil vapors to the desired reaction temperature. Thermal cracking of the oil may adversely affect both the yield and quality of the final product. Since the volume of catalyst contained within the reaction zone in the discontinuous process is normally fixed, increase in the time of contact between the oil vapors and a catalyst mass must be accomplished by reducing the rate of flow of the oil vapors through the reaction chamber. This results in a gradual reduction in the capacity of the unit to produce the given volume of gasoline per unit time. Moreover, a reduction in the rate of throughput of oil through the unit requires further compensating adjustments in furnace temperatures, fractionating tower temperatures, etc.

When constructing a catalytic unit for commercial operations, practical considerations make it desirable to provide a unit capable of operating so as to produce a relatively constant yield of motor fuel over extended periods of time.

In order to reduce original costs in constructing a catalytic cracking apparatus it is also desirable that all parts of the equipment be capable of operating at essentially maximum capacity at all times.

One of the important objects of the present invention is to provide a catalytic cracking process which is not subject to the objections heretofore described and which may be operated at substantially uniform capacity, while maintaining a constant conversion per pass.

A further important object of the invention is to provide a process for carrying out catalytic cracking of the discontinuous type involving alternate cracking, purging and regenerating treatment which may be operated at a constant capacity and with a constant conversion per pass over extended periods of time which may extend even for the life of the catalyst.

A further broad object of the invention is to provide a process for carrying out catalytic cracking of oil in which the conversion per pass may be maintained constant without modifying either the temperature or the throughput of the oil to the unit.

A further important object of the present invention is to provide a method for carrying out catalytic cracking which can be carried out in less expensive equipment and which may be operated at a constant capacity with a constant conversion per pass. A further object of the invention is to provide a catalytic cracking process which is more simple to operate and more readily controllable than prior processes heretofore employed.

Other more detailed objects and advantages of the invention will be apparent from the detailed description appearing hereinafter.

In accordance with one of the broader phases of the invention the average conversion per pass is maintained substantially constant at a constant throughput and constant temperature by reducing the length of the cracking cycle as the activity of the catalyst depreciates with age. Expressed in broader terms, the average conversion per pass is maintained constant by reducing the length of time the catalyst is exposed to the oil vapors between regenerations. This phase of the invention is not necessarily restricted to catalytic cracking processes of the discontinuous type involving alternate cracking and regeneration.

According to another phase of the invention, the length of time between the cracking cycles is reduced as the length of the cracking cycle is reduced to compensate for loss in activity of the catalyst. In other words, according to this phase of the invention, a definite constant time ratio is maintained between the "on stream" period and the "off stream" period. By operating in this manner, a fixed number of reaction chambers in the total bank employed in the intermittent process may be maintained on the cracking cycle throughout the full life of the catalyst. As a result, the cracking equipment may be operated at optimum capacity so that no portion of the cracking equipment will be idle. On the other hand, if a constant time ratio is not maintained between the "on stream" period and the "off stream" period, the number of chambers of the total bank on the cracking stream will vary as the time ratio between the "on stream" and "off stream" periods vary. In such case, it will be apparent that the cracking equipment will not at all times be operating at maximum efficiency and at uniform capacity.

The length of time required for regeneration during the "off stream" period is more or less a function of the amount of coke contained on the catalyst and since this in turn depends upon the length of the cracking cycle, the length of time required for regeneration can be reduced as the cracking cycle is reduced. Any additional compensations can be taken care of by regulating the length of the purging cycle. The term "purging cycle" as here employed is intended to mean the total time when the reaction chamber is neither on the cracking cycle or the regenerating cycle. This time includes the total amount of time necessary for effecting purging, both before and after the cracking operation and also the time necessary for manipulating the valves for converting over from cracking to regenerating and vice versa. Since there are two purging operations during the "off stream" period the total purging cycle will include two purging operations.

According to another more specific aspect of the invention, it is also preferred to maintain a definite constant time ratio between the cracking cycle, the regenerating cycle and the purging cycle. By operating in this manner, the regenerating equipment can likewise be operated at uniform optimum capacity since rate of carbon formation is essentially constant throughout the life of the catalyst if conversion is maintained at a uniform level by the means described above.

The relative proportions of total time required for the cracking cycle, purging cycle and regenerating cycle respectively will depend upon the nature of the charging stock, the temperature employed, the original activity of the catalyst, its ability to maintain its activity after repeated regenerations and other factors. When carrying out the catalytic cracking process operating on virgin gas oil derived from East Texas crudes at a temperature of 800°–900° F. employing activated clay of the type known as Super Filtrol to maintain a 40% conversion per pass, it has been found that the time ratios between the purging cycle, cracking cycle and regenerating cycle preferably will be of the order of 1, 2, and 3. For example, when the catalyst is fresh, the length of the cracking cycle may, for example be one hour. In such case, the length of the purging cycle will be 30 minutes and the length of the regenerating cycle will be 90 minutes. The ratio between the "on stream" and "off stream" period in such case will be as 1 is to 2.

It will be understood that the invention is not limited to the specific ratio of time devoted to the cracking, regenerating and purging cycles respectively, but will vary according to the above factors.

With the above general nature and objects set forth, the invention will now be described with reference to the accompanying drawing which is a diagrammatic illustration of an apparatus capable of carrying the invention into effect.

Referring to Fig. 1, the oil to be cracked, which is preferably a clean condensate stock, is charged to the cracking unit through charge line 10 containing a pump 11. The pump 11 forces the oil through a pre-heating coil 12 located in furnace 13 in which the oil is vaporized and heated to the desired temperature for carrying out the catalytic cracking operation. The oil after being preheated to the required temperature in the heating coil 12 passes through transfer line 14 to a manifold line 15 having branch lines 16—22 inclusive leading to 6 separate reaction chambers 23, 24, 25, 26, 27 and 28 respectively. While 6 reaction chambers have been shown, it will be understood that the invention in its broader aspects is not restricted to the specific number of reaction chambers employed although the use of 6 reaction chambers has been found to lend itself particularly well to the carrying out of the operation.

If desired a separator may be provided between the heating coil 12 and the reaction chambers to separate any unvaporized constituents which may be retained in the feed.

Each of the reaction chambers 23 to 28 inclusive contains a mass of catalytic material capable of bringing about the desired catalytic cracking reaction. Such catalyst may comprise for example, naturally active or activated adsorbent clays, synthetic gels of silica and alumina, or other types of oxide gels.

For convenience and simplicity, the reaction chambers are shown provided with a single body of catalytic material with the introduction of the products to be treated in one end of the reaction chamber and the withdrawal of the reaction products from the opposite end. It will be understood, however, that additional equipment may be provided for effecting more intimate dispersion of the reaction products throughout the catalyst mass and for more rapid regeneration of the catalyst. For example, the oil to be cracked and the regenerating gas may be introduced and removed from the catalyst mass through a series of perforated tubes embedded within the mass or the catalyst may be supported on a plurality of spaced trays with suitable distributing ducts so that the oil vapors may be passed either in series or parallel through the individual trays, whereas the regenerating gases may be passed in parallel through the individual beds of catalyst supported on each tray.

By operating valves in branch lines 16—22 inclusive, the oil vapors from the manifold 15 may be selectively passed to any one or more of the reaction chambers 23—28 inclusive. The oil vapors, after passing through the reaction chambers will be withdrawn from the opposite ends thereof through branch lines 30—35 inclusive leading to a manifold line 36 from whence they pass through line 37 to a fractionating tower 38. The cracked products from the reaction chambers are subjected to fractionation within the fractionating tower 38 and insufficiently cracked products are condensed as reflux condensate. The reflux condensate formed in the fractionating tower 38 is withdrawn through line 39 and may be passed to storage through line 41 or a part or all may be recycled through line 42 provided with pump 43 to the charge line 10 for further cracking treatment. Vapors remaining uncondensed in the fractionating tower 38 including the desired distillate product pass overhead through line 44 to a condenser 45 wherein the desired distillate product is condensed. Products from the condenser 45 pass to a receiver 46 wherein the liquid distillate separates from the uncondensed gases. Gases separated in the receiver 46 are removed therefrom through valve line 47 and may be passed to a suitable absorption system for removing motor fuel constituents therefrom. The desired distillate collected in the receiver 46 is withdrawn through line 48 and is passed to suitable storage tanks. This product may be subjected to any desired further finishing treatment for producing the desired product.

In order to regenerate the catalyst mass within the reaction chambers provision is made for introducing regenerating gases into the various chambers. To this end a single regenerating circuit is provided for each pair of reaction chambers. To effect regeneration of the catalyst in either chambers 23 or 24, regenerating gas is introduced through line 51. This regenerating gas may be air or air diluted as hereinafter described, and is preheated to the required temperature to ignite the carbon contained on the catalyst mass. The regenerating gas introduced through line 51 is forced by means of blower 52 through line 53 to a manifold line 54 having branch lines 55 and 56 merging with branch lines 16 and 17 leading to reaction chambers 23 and 24 respectively. The products of regeneration are withdrawn from the reaction chambers 23 and 24 through the branch lines 30 and 31 respectively, leading to a manifold line 57 from whence they pass through line 58 and may be rejected from the system through line 59 or a part of the products of regeneration may be recycled through line 61 and heat exchanger 62 to the inlet side of the blower 52 to preheat and dilute the regenerating gas passing to the reaction chambers.

Reaction chambers 25 and 26 are likewise provided with a similar regenerating circuit including a blower 63 which picks up gases from the inlet line 64 and forces them through line 65 to a manifold line 66 having branch lines 67 and 68 merging with branch lines 18 and 19 respectively leading to chambers 25 and 26 respectively. Products of regeneration from chambers 25 and 26 are withdrawn through branch lines 32 and 33, a manifold line 69 and 71 and may be rejected from the system through line 72 or a part of such gases may be recycled through lines 73 and heat exchanger 74 to the inlet of the blower 63 for preheating and tempering the regenerating gases.

Reaction chambers 27 and 28 are also provided with a similar regenerating circuit including a blower 75 which forces regenerating gases, introduced through line 76, through line 77, manifold line 78, branch lines 79 and 80 to branch lines 21 and 22 respectively leading to chambers 27 and 28 respectively. Products of regeneration are withdrawn from the opposite end of the reaction chambers through branch lines 34 and 35, manifold line 81, line 82 and may be withdrawn from the system through line 83 or a part of the regenerated products may be recycled through line 84 and heat exchanger 85 to the inlet side of the blower 75 for preheating and tempering the regenerating gases.

Each of the reaction chambers is also provided with suitable means for purging the catalyst mass of residual oil vapors and regenerating gas before and after the cracking and regenerating cycles. For convenience reaction chambers 23 to 28 are shown provided with inlet lines 86 to 91 inclusive for introducing a purging medium, such as steam, and outlet lines 92 to 97 inclusive for removing the purged products from the reaction chamber. If desired, these lines may be connected with a vacuum pump for evacuating the chamber. The products resulting from purging the catalyst of residual oil vapors may be sent to a suitable fractionating or recovery system for removing the oil therefrom.

It will be understood that in carrying out the cracking process certain of the reaction chambers will be on the cracking cycle, whereas the remainder will be on the purging and regenerating cycles. It will be understood that the pipe lines carrying the oil vapors through the cracking circuit, the lines carrying the regenerating gas through the regenerating circuit and the lines carrying the purging gas through the purging circuit are provided with suitable valves so that either the cracking stream, the regenerating stream or the purging stream may be selectively passed to any one or more of the six reaction chambers. The proper valves to be operated to change from cracking to regenerating and purging will be obvious from the drawing and need not here be described.

The invention may be better understood by giving a specific example of the method of beginning and carrying out the operation in the equipment illustrated in the accompanying drawing. In the example, let it be first assumed that it is desired to carry out the cracking operation in two of the reaction chambers while one of the reaction chambers is undergoing the purging operation and the remaining three are under regeneration. Let it be further assumed that at the start of the cracking operation the length of the cracking cycle will be one hour. In this case the length of the purging cycle will be 30 minutes and the length of the regenerating cycle 90 minutes. The purging cycle will be divided into two periods of 15 minutes each, one following the cracking period and one following the regenerating period.

At the start of the operation, one of the reaction chambers, which for convenience will be assumed to be chamber 23, will be first preheated to the required reaction temperature in any suitable manner such as by the introduction of a hot inert gas through purge line 86. When the reaction chamber 23 has been preheated to the desired reaction temperature, the valve in branch line 16 leading from the oil distributing manifold 15 to the reaction chamber will be opened and the valve in branch line 30 interconnecting reaction chamber 23 with the fractionating system will also be opened. Hot oil vapors from the heating coil 12 will then pass through transfer line 14, manifold line 15 and branch line 16 into the reaction chamber. Products of the reaction will be withdrawn from branch line 30 and passed through manifold line 36 to the fractionating tower 38 wherein the cracked products will be subjected to fractionation to separate the undesired higher boiling condensates therefrom. The cracking operation will proceed employing one reaction chamber 23 for a period of a half hour. During this time or prior thereto, reaction chamber 25 may be also preheated in any suitable manner to the desired reaction temperature. At the end of the first half hour period the valves in branch lines 18 and 32 are opened connecting reaction chamber 25 with the cracking circuit and the fractionating equipment.

Reaction chambers 23 and 25 will then be on the cracking cycle. This cracking operation is continued for another half hour period. During this time or prior thereto, reaction chamber 27 is brought to the desired reaction temperature by any suitable manner. At the end of the second half hour period following the start of the operation reaction chamber 23 will have been on the cracking cycle for one hour and reaction chamber 25 for a half hour. Reaction chamber 23 will then be withdrawn from the cracking cycle and reaction chamber 27 substituted in its place by operating the necessary valves.

Thereafter the valves in purging lines 86 and 92 of the reaction chamber 23 will be opened and the catalyst in reaction chamber 23 purged of residual oil vapors. This purging operation including the lost time necessary for operating the valves for changing the cycles will be carried out for a period of 15 minutes. At the end of this period, regeneration of the catalyst in reaction chamber 23 will be started by operating the blower 52 and opening the necessary valves. It will be understood that during this operation the valves in the manifold line connecting reaction chamber 24 with the regenerating circuit will be closed.

At the end of the first hour and fifteen minutes from the start of the operation, therefore, the reaction chamber 23 will be placed on the regenerating circuit.

At the end of one hour and a half following the starting of the operation, reaction chamber 25 will have completed the one hour cracking cycle. This chamber will then be disconnected from the cracking circuit and the reaction chamber 24 substituted in its place. Reaction chamber 25 will then be placed on the purging circuit for the next fifteen minute reaction period. Following this period reaction chamber 25 will be placed on the regenerating circuit by starting blower 63 and operating the necessary valves.

At the end of two hours following the start of the operation, reaction chamber 27 will have completed a one hour cracking cycle. This chamber will then be disconnected from the cracking circuit and placed on the purging circuit and chamber 26 placed on the cracking circuit. After chamber 27 has been on the purging circuit for 15 minutes, blower 75 will be started and regeneration begun in reaction chamber 27.

At the end of two hours and fifteen minutes following the cracking cycle, reaction chambers 26 and 24 will be on the cracking circuit, whereas chambers 23, 25 and 27 will be on the regenerating circuit. At the end of two and one half hours following the starting of the operation, reaction chamber 24 will have completed a one hour cracking cycle. The cracking operation in reaction chamber 24 will then be transferred to reaction chamber 28 and chamber 24 placed on the purging cycle. Thus all of the cracking chambers at this point will have been placed on stream at half hour intervals so that only one chamber is changed over at any one time. Fifteen minutes later, reaction chamber 23 will have completed a 90 minute regenerating cycle and reaction chamber 24 will have completed the purging treatment and been placed on the regenerating circuit. At this point chamber 23 will be placed on the purging circuit.

At the end of the next fifteen minute period, the catalyst in reaction chamber 23 will have been purged of the regenerating gases and ready for starting the second cracking cycle. At this time, reaction chamber 26 will have completed a one hour cracking cycle and the cracking process will be transferred from reaction chamber 26 to reaction chamber 23, thus starting the second cycle of cracking in reaction chamber 23.

After the cracking unit has been brought on stream in the manner just described, the cycle of operations will be repeated in the same sequence as that just mentioned. It will be noted from the above description that one and only one reaction chamber of the respective pairs 23—24, 25—26 and 27—28 will be on the regenerating circuit at any one time. Consequently, it is only necessary to provide the three regenerating units with sufficient capacity to regenerate one reaction chamber of each of the respective pairs. Likewise, only one reaction chamber of the total will be on the purging circuit at any one time and only two reaction chambers will be on the cracking circuit.

As the cracking process continues and the activity of the catalyst drops off, the length of the cracking cycle is shortened to compensate for loss in activity as previously described. By correspondingly reducing the purging and regenerating time, the same number of reaction chambers will always be on the cracking cycle and the same number on the regenerating cycle. For example, assuming the total life of the catalyst to be 4500 hours at the end of 500 hours, the length of the cracking cycle may have been reduced from 60 to 36 minutes and at the end of 1620 hours, to 24 minutes. At the end of 3000 hours, the length of the cracking cycle may be reduced to 20 minutes and at the end of 4500 hours to 16 minutes. The total purging cycle will be correspondingly reduced from 30 minutes to 18, 12, 10 and 8 respectively. The regenerating cycle may be likewise reduced from 90 to 54 to 36 to 30 to 24 respectively.

The above results are set forth below in tabular form:

| Catalyst life | Hours | | | | |
|---|---|---|---|---|---|
| | 0 | 500 | 1620 | 3000 | 4500 |
| | Min. | Min. | Min. | Min. | Min. |
| Cracking | 60 | 36 | 24 | 20 | 16 |
| Purging | 30 | 18 | 12 | 10 | 8 |
| Regeneration | 90 | 54 | 36 | 30 | 24 |

It will thus be seen that throughout the life of the catalyst the ratio of the length of the cracking cycle and the length of time between the cracking cycles is fixed. In the particular example given, the time between the cracking cycles is twice the length of the cracking cycle. Also, in the above example, the relative amount of time devoted to turning around from cracking to regeneration and vice versa, herein called the purging cycle, is one half the length of the cracking cycle and one third the length of the regenerating cycle.

It will be understood, however, that this invention is not limited in its broader aspects, to this particular time ratio between the cracking, regenerating and purging cycles. However, when employing a conventional acid-treated clay such as Filtrol or the like, employing conventional charging stock such as East Texas virgin gas oils, this time ratio seems to be the best. In other cases it may be desirable to operate with a time ratio between the on-stream period and the off-stream period of 1:1. In such case, when employing six reaction chambers as previously described, three reaction chambers may be on the cracking cycle, two on the regenerating cycle and one on the purging cycle. Furthermore, it may be desirable in some cases to change the ratio during the life of the catalyst. For example, during the early life of the catalyst it may be desirable to employ the same time ratio given in the example, whereas during the final period in the life of the catalyst, the length of the cracking cycle as compared to the length of the purging and regenerating cycle may be somewhat increased. While this will normally result in a somewhat lower conversion per pass, it may be advisable in some cases to accept a lower conversion per pass during the final stages in the life of the catalyst in order to prolong the life of the catalyst.

While the invention has been described with specific reference to the catalytic cracking of oils it will be understood that in its broader aspects it will have application to other high temperature treatment of carbonaceous materials employing solid catalysts in which the catalyst must be periodically regenerated such as in processes involving desulphurization, dehydrogenation, hydrogenation, polymerization, reforming and the like.

Having thus described the invention, it will be understood that it embraces such other variations and modifications as come within the spirit and scope thereof and that it is not my intention to unnecessarily restrict the invention or dedicate any novel features thereof.

I claim:

1. In the catalytic treatment of hydrocarbon oils wherein the oil to be treated is contacted with a solid catalyst which becomes fouled with carbonaceous deposits during the treating process necessitating frequent regenerations of such catalysts and wherein the activity of such catalysts gradually depreciates as the treatment continues; the improvement in the method of operating such process comprising reducing the length of the oil treatment between the regenerations as the activity of the catalyst depreciates to thereby maintain substantially uniform catalyst activity.

2. In the catalytic cracking of hydrocarbon oil into lower boiling products suitable for motor fuel wherein the oil to be cracked is passed through a reaction zone containing a mass of solid catalyst, and the cracking operation is periodically interrupted and the mass regenerated to remove carbonaceous deposits and wherein the catalyst gradually loses its activity as the cracking cycles continue; the improvement in the method of operating such process which comprises reducing the length of the cracking treatment between regeneration as the activity of the catalyst is reduced.

3. In the catalytic conversation of hydrocarbons involving alternate conversion and regenerating cycles within the same reaction zone, wherein a plurality of independent reaction zones are provided and the conversion cycle is transferred from one reaction zone to another when it becomes desirable to regenerate the catalyst whereby the conversion process may be operated continuously and wherein the activity of the catalyst gradually depreciates as the number of cracking cycles increases; the improvement in the method of operating such process which comprises reducing the length of the conversion cycles as the activity of the catalyst depreciates to maintain substantially constant conversion per pass at a given temperature and feed rate despite loss in activity of such catalyst.

4. In the catalytic conversion of hydrocarbons into lower-boiling products suitable for motor fuel involving repeated periodic cracking cycles in individual reaction zones with intervening regenerating periods between the respective cracking cycles wherein a plurality of independent reaction zones is provided and the cracking cycle is transferred from one reaction zone to another when it becomes necessary to regenerate the catalyst and wherein the activity of the catalyst gradually depreciates as the number of cracking cycles increases; the improvement in the method of operating such process which comprises reducing the length of the individual cracking cycles as the activity of the catalyst depreciates, correspondingly reducing the regenerating periods between the cracking cycle whereby a substantially constant time ratio is maintained between the length of the cracking cycle and the length of the interval between the cracking cycles.

5. In the catalytic conversion of hydrocarbons into lower-boiling products suitable for motor fuel wherein the oil to be cracked is passed through a reaction zone for a predetermined period, the cracking process then discontinued, the reaction zone then purged of residual oil vapors, the catalyst mass contained in said reaction zone then regenerated, the reaction zone thereafter purged of products of regeneration and returned to the cracking process and wherein a plurality of independent reaction zones is provided and the cracking process transferred from one reaction zone to another to permit regeneration of the catalyst mass contained therein without interrupting the cracking operation and wherein the activity of the catalyst mass gradually depreciates as the length of the cracking operation increases; the improvement in the method of operating such process which comprises reducing the length of the cracking period between regenerations as the activity of the catalyst depreciates, correspondingly reducing the length of the purging and regenerating treatments to maintain a substantially constant time ratio between the length of the cracking process between regenerations and the length of time interval between the cracking processes.

6. In the catalytic conversion of hydrocarbons into lower-boiling products suitable for motor fuel wherein the activity of the catalyst gradually depreciates as the cracking operation continues; the method which comprises passing a stream of oil vapors to be cracked through a reaction zone containing a solid catalyst maintained at reaction temperature, continuing the passage of said oil vapors through said reaction zone until the percent conversion of said oil into lower boiling motor fuel products has dropped to a predetermined minimum by formation of carbonaceous deposits on said catalyst, thereafter transferring the stream of oil vapors to be cracked to another reaction zone containing a catalyst mass, successively passing the oil vapors to be cracked from one reaction zone to another when the percentage conversion of said oil into the desired motor fuel products has been reduced to a predetermined minimum, purging the catalyst mass in the reaction zone of residual oil vapors following the cracking operation, thereafter passing an oxidizing gas through said purged catalyst mass at a temperature sufficient to burn carbonaceous deposits therefrom and regenerate said catalyst, thereafter purging the regenerated catalyst of regenerating gases, then repeating the cracking treatment in said reaction zone containing the purged and regenerating catalyst mass and maintaining a constant time ratio between the length of the cracking treatment and the total length of the purging and regenerating treatment in each reaction zone over extended periods as compared to the length of the individual cracking, purging and regenerating period.

7. A method of catalytically cracking higher boiling hydrocarbons into lower-boiling products suitable for motor fuel which comprises passing a stream of oil vapors to be cracked through a reaction zone containing a solid catalyst maintained at reaction temperature, continuing the passage of said oil vapors through said reaction zone until the per cent conversion of said oil into lower-boiling motor fuel products has dropped to a predetermined minimum by the formation of carbonaceous deposits on said catalyst, thereafter transferring the stream of oil vapors to be cracked to another reaction zone containing a catalyst mass, successively passing the oil vapors to be cracked from one reaction zone to another when the percentage conversion of said oil in the desired motor fuel products has been reduced to a predetermined minimum by the formation of carbonaceous deposits on the catalyst contained therein, purging the catalyst mass in the respective reaction zones of residual oil vapors following the cracking operation, thereafter passing an oxidizing gas through said purged catalyst mass at a temperature sufficient to burn carbonaceous deposits therefrom and regenerate said catalyst, thereafter purging the regenerated catalyst of regenerating gases, then repeating the cracking treatment in said reaction zone containing the purged and regenerated catalyst mass, and maintaining a constant time ratio between the length of the cracking treatment, the length of the purging treatment, and the length of the regenerating treatment in each reaction zone over extended periods as compared to the length of the individual cracking, purging and regenerating treatments.

8. In the catalytic cracking of hydrocarbon oils into lower-boiling hydrocarbons suitable for motor fuel wherein a plurality of reaction zones are provided and the cracking treatment is periodically transferred from one reaction zone to another and each reaction zone is repeatedly subjected to alternate cracking and regenerating treatment and wherein the activity of the catalyst gradually depreciates as the number of cracking and regenerating cycles increases; the improvement which comprises reducing the length of the cracking cycle as the activity of the catalyst depreciates and correspondingly reducing the length of the period between the cracking cycles to maintain a substantially constant ratio of time between the length of the cracking cycle and the length of the interval therebetween.

9. In the catalytic conversion of hydrocarbons into lower-boiling products suitable for motor fuel wherein the activity of the catalyst gradually depreciates as the cracking operation continues; the method which comprises passing a stream of oil vapors to be cracked through a reaction zone containing a solid catalyst maintained at reaction temperature, continuing the passage of said oil vapors through said reaction zone until the per cent conversion of said oil into lower boiling motor fuel products has dropped to a predetermined minimum by formation of carbonaceous deposits on said catalyst, thereafter transferring the stream of oil vapors to be cracked to another reaction zone containing a catalyst mass, successively passing the oil vapors to be cracked from one reaction zone to another when the precentage conversion of said oil into the desired motor fuel products has been reduced to a predetermined minimum, purging the catalyst mass in the reaction zone of residual oil vapors following the cracking operation, thereafter passing an oxidizing gas through said purged catalyst mass at a temperature sufficient to burn carbonaceous deposits therefrom and regenerate said catalyst, thereafter purging the regenerated catalyst of regenerating gases, then repeating the cracking treatment in said reaction zone containing the purged and regenerated catalyst mass and maintaining a constant time ratio between the length of the cracking treatment and the length of the regenerating treatment over an extended period as compared to the length of the individual cracking and regenerating periods.

CHARLES W. TYSON.